United States Patent
Stegemoeller et al.

(10) Patent No.: US 10,065,815 B2
(45) Date of Patent: Sep. 4, 2018

(54) COMPACT PROPPANT STORAGE AND DISPENSING SYSTEM

(71) Applicant: Halliburton Energy Services, Inc., Houston, TX (US)

(72) Inventors: Calvin L. Stegemoeller, Duncan, OK (US); Chad A. Fisher, Duncan, OK (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 141 days.

(21) Appl. No.: 15/033,228

(22) PCT Filed: Feb. 11, 2014

(86) PCT No.: PCT/US2014/015733
§ 371 (c)(1),
(2) Date: Apr. 29, 2016

(87) PCT Pub. No.: WO2015/122875
PCT Pub. Date: Aug. 20, 2015

(65) Prior Publication Data
US 2016/0280476 A1    Sep. 29, 2016

(51) Int. Cl.
*B65G 65/40* (2006.01)
*E21B 43/267* (2006.01)
*B65G 3/04* (2006.01)

(52) U.S. Cl.
CPC ............... *B65G 65/40* (2013.01); *B65G 3/04* (2013.01); *E21B 43/267* (2013.01)

(58) Field of Classification Search
CPC .................... B65G 65/40; B65G 3/40
See application file for complete search history.

(56) References Cited

U.S. PATENT DOCUMENTS 3,314,557 A * 4/1967 Sackett, Sr. ............... B28C 9/00
                                                              366/18
8,926,252 B2 * 1/2015 McIver ................. B60P 1/6427
                                                              414/332
(Continued)

FOREIGN PATENT DOCUMENTS

WO    2015/122875 A2    8/2015

OTHER PUBLICATIONS

PSI Prop Equipment Systems Inc., PropMaster mobile sand silo product information: <http://www.propequipment.com/#products-anchor>.

(Continued)

*Primary Examiner* — Kaitlin S Joerger
(74) *Attorney, Agent, or Firm* — McDermott Will & Emery LLP (57) ABSTRACT

A proppant tower comprising: a main body configured to be in a substantially vertical orientation in a working position; a base mounted on a bottom end of the main body, such that the main body rests on the base when in the working position; a bin disposed within the main body; and an outlet having two ends, the first end radially extending from the main body below the bin and in fluid communication with the bin and the second end being open, such that particulates are discharged from the bin into the first end of the outlet and out of the second end of the outlet, wherein the outlet radially extends from the main body at a location on the main body that permits at least four proppant towers to be arranged about a single particulate collection device.

20 Claims, 3 Drawing Sheets

(56) References Cited

U.S. PATENT DOCUMENTS

| | | | |
|---|---|---|---|
| 8,944,740 B2* | 2/2015 | Teichrob | B65G 63/008 |
| | | | 414/268 |
| 9,169,706 B2* | 10/2015 | Kellam, III | E21B 43/267 |
| 2007/0201305 A1 | 8/2007 | Heilman et al. | |
| 2008/0029553 A1 | 2/2008 | Culleton | |
| 2010/0071284 A1 | 3/2010 | Hagan et al. | |
| 2012/0024738 A1 | 2/2012 | Herman et al. | |
| 2012/0073506 A1 | 3/2012 | Meritt | |
| 2013/0004272 A1 | 1/2013 | Mintz | |
| 2013/0142601 A1 | 6/2013 | McIver et al. | |
| 2013/0161354 A1 | 6/2013 | Oren | |
| 2013/0164112 A1 | 6/2013 | Oren | |
| 2013/0312951 A1 | 11/2013 | Kellam, III | |
| 2015/0166260 A1* | 6/2015 | Pham | B65D 88/30 |
| | | | 414/471 |
| 2016/0236880 A1* | 8/2016 | Herman | B65G 65/32 |
| 2016/0280476 A1* | 9/2016 | Stegemoeller | E21B 43/267 |
| 2017/0291780 A1* | 10/2017 | Sherwood | B65G 11/146 |

OTHER PUBLICATIONS

Quickthree Solutions Inc., Quicksand Silo brochure.
International Search Report and Written Opinion for PCT/US2014/015733 dated Oct. 21, 2015.

* cited by examiner

COMPACT PROPPANT STORAGE AND DISPENSING SYSTEM

BACKGROUND

The embodiments herein relate to conserving labor and infrastructure during subterranean formation operations, and more particularly, to conserving labor and infrastructure using a compact proppant storage and dispensing system.

Subterranean wells (e.g., hydrocarbon producing wells) are often stimulated by hydraulic fracturing treatments. In hydraulic fracturing treatments, a treatment fluid, which may also function simultaneously or subsequently as a carrier fluid, may be pumped into a portion of a subterranean formation (which may be referred to herein simply as "formation") at a rate and pressure sufficient to break down the formation and create one or more fractures therein. Typically, particulate solids, such as graded sand, are suspended in a portion of the treatment fluid and then deposited into the fractures. The particulate solids, known as "proppant particulates" (which may also be referred to herein as "proppant" or "propping particulates") serve to prevent the fractures from fully closing once the hydraulic pressure is removed. By keeping the fractures from fully closing, the proppant particulates aid in forming conductive paths through which fluids produced from the formation may flow to the surface for collection.

The amount and type of proppant particulates necessary to complete a particular hydraulic fracturing operation may depend on a number of factors including, but not limited to, the type of subterranean formation being treated, the downhole conditions of the particular formation, the completion design, and the like. Typically, a large amount of proppant particulates is required to complete a hydraulic fracturing operation. Moreover, it is often required that the hydraulic fracturing operation be completed at several well locations within a designated amount of time. Thus, such operations characteristically involve multiple equipment pieces, which may require minor or major movement at a worksite, in order to store and transport proppant particulates to a designated location for treatment of the formation.

In a typical hydraulic fracturing operation, multiple proppant storage vessels are placed at the well site and arranged about a conveyer belt. The vessels are capable of holding proppant particulates and dispensing the proppant particulates onto the conveyer belt. The conveyer belt then delivers the proppant particulates to a blender, which incorporates them into a treatment fluid for pumping downhole into the subterranean formation. Depending on the number and size of vessels, a sand storage facility or trailer may be positioned near the vessels such that they may be refilled with proppant particulates, as needed. The multiple equipment pieces necessary to store and convey the proppant particulates to the blender during a hydraulic fracturing operation (e.g., the vessels, the conveyer belt, and the like) require a significant portion of the worksite to be dedicated to accommodating the large equipment footprint, may increase the cost of the operation due to loss of proppant particulates from the conveyer belt, increase the complexity of the worksite design in terms of both equipment and personnel logistics, and generally require large expenditures to perform and successfully complete the operation.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The embodiments herein relate to conserving labor and infrastructure during subterranean formation operations, and more particularly, to conserving labor and infrastructure by using a compact proppant storage and dispensing system.

The compact proppant storage and dispensing system disclosed in various embodiments herein permit four or more individually designed proppant towers to be arranged about a single proppant collection device, such as a blender, each capable of directly depositing the proppant particulates, or any other type of particulates, therein. The proppant towers according to the embodiments herein have an outlet able to discharge proppant particulates that is configured at a particular height from the ground, angle from the proppant tower, and location on the proppant tower to permit arrangement of multiple proppant towers around a single collection device.

The proppant towers according to the embodiments herein eliminate the need for large, costly, and often wasteful conveyer belts and, in many cases, eliminate or at least reduce the need for and/or size of sand storage facilities or trailers at the worksite. The embodiments herein allow proppant particulates to be delivered to a blender for mixing and downhole use while decreasing the equipment footprint necessary for such delivery and, thus, may reduce the time and labor required to perform hydraulic fracturing operations. Accordingly, the embodiments herein may have a positive economic impact on efficiency and production. It will be appreciated by one of skill in the art that while four or more individually designed proppant towers may be arranged about a single blender, a fewer number of proppant towers may be arranged thereabout without departing from the scope of the present disclosure.

Although some embodiments described herein are illustrated by reference to hydraulic fracturing treatments, the methods and apparatuses disclosed herein may be used in any subterranean formation operation that may benefit from a compact storage and dispensing system, as described herein. Such treatment operations may include, but are not limited to, a frac-packing operation; a gravel packing operation; and any combination thereof.

Moreover, the methods and apparatuses described herein may be used in any non-subterranean operation that may benefit from a compact storage and dispensing system. Such operations may be performed in any industry including, but not limited to, oil and gas, mining, chemical, pulp and paper, aerospace, automotive, asphalt and/or concrete (e.g., portable paving applications), and the like.

One or more illustrative embodiments disclosed herein are presented below. Not all features of an actual implementation are described or shown in this application for the sake of clarity. It is understood that in the development of an actual implementation incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

The use of directional terms herein such as above, below, upper, lower, upward, downward, left, right, uphole, downhole and the like are used in relation to the illustrative embodiments as they are depicted in the figures, unless otherwise stated, the upward direction being toward the top of the corresponding figure and the downward direction being toward the bottom of the corresponding figure, the uphole direction being toward the surface of the well and the downhole direction being toward the toe of the well.

Figure 1:
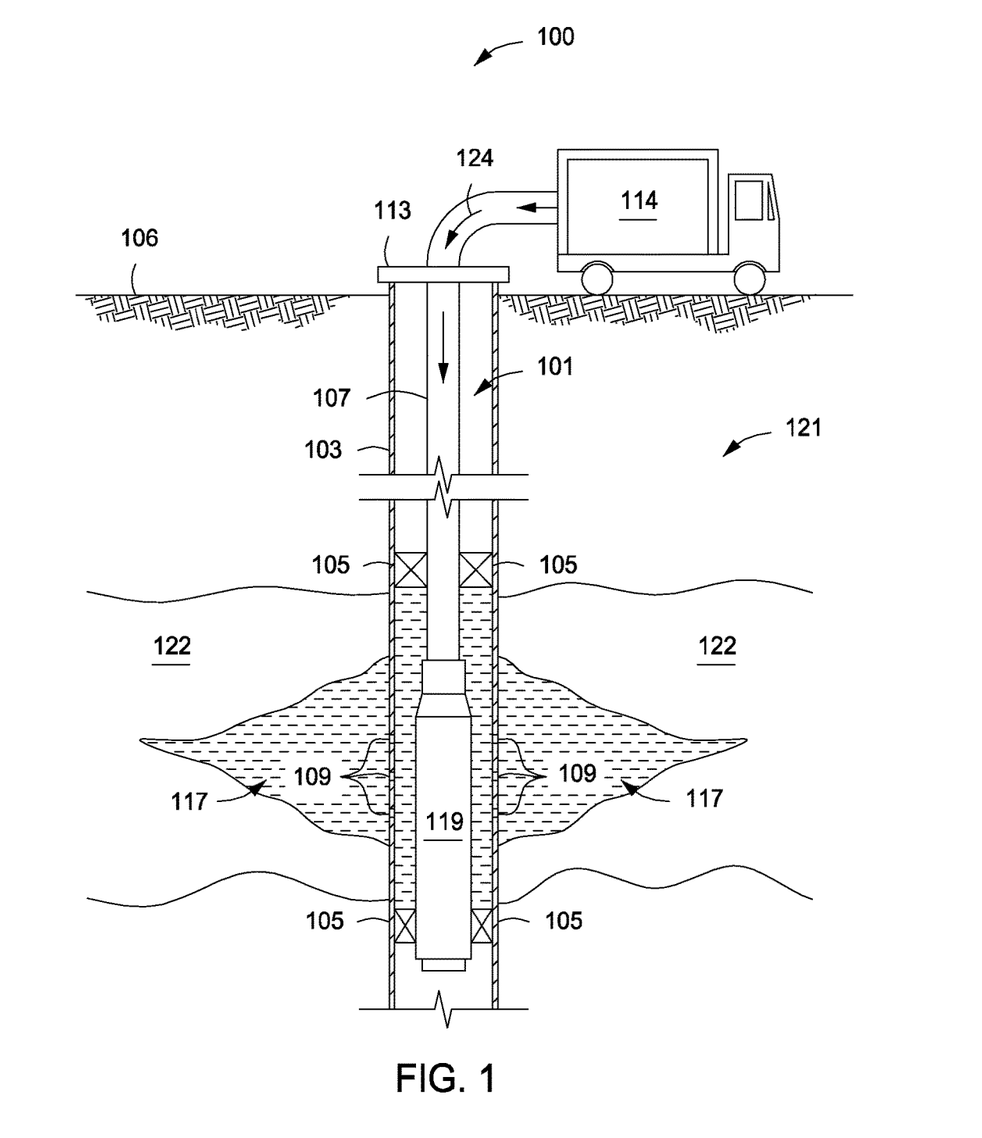
FIG. 1 illustrates a well system that exemplifies some of the principles of the present disclosure, according to one or more embodiments described herein.

Referring now to FIG. 1, illustrated is an example of a well system 100 for performing a hydraulic fracturing operation in a subterranean formation. As depicted, the well system 100 includes a well head 113 and a wellbore 101 extending downwardly into a subterranean formation 121 beneath the surface 106. As illustrated, the wellbore 101 includes a generally vertical section and a casing string 103, which may be cemented or otherwise affixed therein. One or more perforations 109 (six shown) may be formed in the casing 103 and through the formation 121 to allow treatment fluids, proppant particulates, and/or other materials to flow into the formation 121. The perforations 109 may be formed by any means known to those of skill in the art including, but not limited to, shape charges, a perforating gun, a hydrojetting tool, and the like.

Working string 107 may be disposed in the wellbore 101. The working string 107 may be any wellbore tubular including, but not limited to, coiled tubing, sectioned pipe, and the like. As depicted in FIG. 1, fracturing tool 119 may be coupled to the working string 107 and used to fracture a treatment interval 122 in the formation 121. Packers 105 may be disposed in the annulus of the wellbore 101 above and below the treatment interval 122. The packers 105 may be any type of packer known to those of skill in the art including, but not limited to, mechanical packers, fluid inflatable packers, sand packers, and the like.

As depicted in FIG. 1, the working string 107 may be coupled to a pump truck 114 (e.g., a frac blender truck or trailer) at the surface 106. The pump truck 114 may include, for example, mobile vehicles, immobile installations, skids, hoses, tubes, fluid tanks or reservoirs, pumps, valves, or other suitable structures and equipment. During hydraulic fracturing, the pump truck 114 may receive proppant particulates from proppant towers (not shown) and blend the proppant particulates with fluids to form a proppant-laden treatment fluid. The treatment fluid 124 maybe be pumped out of the pump truck 114, into the working string 107, and to the fracturing tool 119. The fracturing tool 119 may then inject the treatment fluid 124 through the perforations 109 and into the treatment interval 122 in formation 121, thereby forming fractures 117 therein. The proppant particulates may be deposited in the fractures 117 to prop the fractures open for well production.

It will be appreciated by one of skill in the art that the well system 100 of FIG. 1 is merely one example of a wide variety of well systems in which the principles of the present disclosure may be utilized. Accordingly, it will be appreciated that the principles of this disclosure are not necessarily limited to any of the details of the depicted well system 100, or the components or equipment thereof, as shown in the drawings or otherwise described herein. For example, it is not necessary in keeping with the principles of this disclosure for the wellbore to include a generally vertical wellbore 101. Rather, the wellbore may be generally horizontal, slanted, deviated, or any other wellbore orientation. Additionally, it is not necessary that the wellbore 101 comprise a casing string 103, as the wellbore may be wholly uncased or may comprise cased and uncased portions, and any cased sections need not be cemented in place. Moreover, it is not necessary that the fractures 117 be made through perforations 109, as the fractures 117 may be made directly into the formation 121 at the treatment interval 122, which need not be limited to a single treatment interval in the wellbore 101. Further, natural occurring fractures or fracture networks may be present within the formation 121, which may receive the treatment fluid 124 and be propped open by the proppant particulates included therein.

Figure 2:
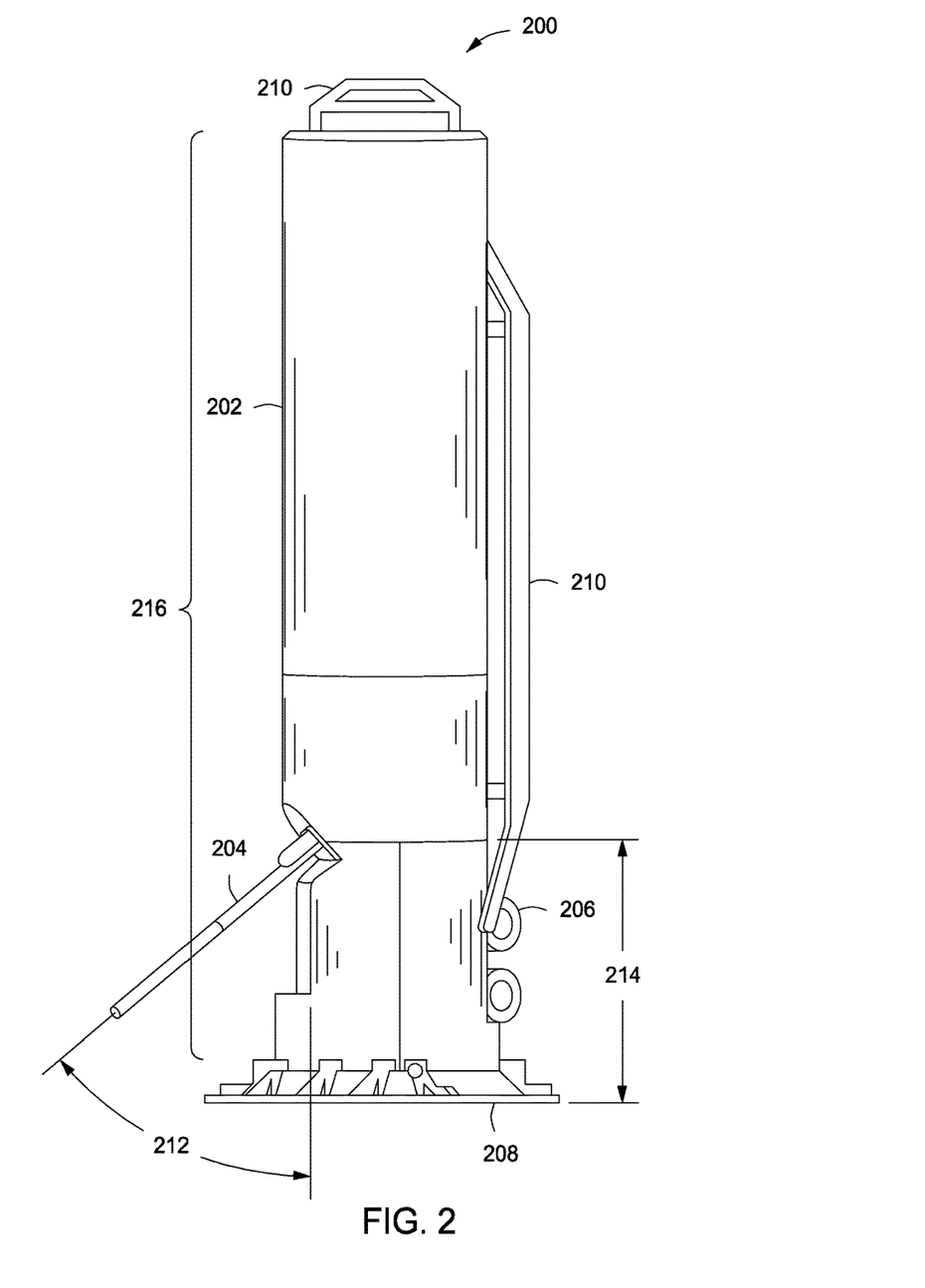
FIG. 2 illustrates an exemplary proppant tower according to one or more embodiments described herein.

Referring now to FIG. 2, illustrated is an exemplary proppant tower 200 according to one or more embodiments of the present disclosure. As depicted, the proppant tower 200 is in its vertical (or "working") orientation and includes a main body 216 and an outrigger base 208 mounted on the bottom of the body 216, such that the body 216 rests on the base in the vertical orientation. The outrigger base 208 may extend radially from the center of the proppant tower 200 a sufficient distance to stabilize the weight of the proppant tower 200 both when it is storing proppant particulates and when it is not. The outrigger base 208 should be sufficiently sized to maintain the proppant tower 200 in its vertical orientation in inclement weather (e.g., during strong wind, rain, and the like). Although the outrigger base 208 is depicted as four rectangular radially extending components forming a square base, with each component detached at the corner from each neighboring component (see FIG. 3), it will be appreciated by one of skill in the art that the outrigger base 208 may be of any other configuration, without departing from the scope of the present disclosure. For example, the outrigger base 208 may be a single component base, a bi-component base, or any other configuration capable of stabilizing the weight of the proppant tower 200 in its vertical orientation.

The proppant tower 200 may be delivered to the work site in its horizontal (or "road") orientation. A trailer 210 may be mounted onto the proppant tower 200 and configured to hitch onto a mobile vehicle (e.g., a towing vehicle). In its horizontal orientation, the proppant tower 200 may be movable by use of wheels 206 arranged at or near the outrigger base 208. The trailer 210 may be configured to aid in positioning the proppant tower 200 in its vertical orientation and thereafter to retract toward the proppant tower 200 to reduce the footprint of the proppant tower 200 at the worksite. The trailer 210 may be retracted by any means known to those of skill in the art including, but not limited to, a pneumatic or hydraulic ram. Although FIG. 2 depicts trailer 210 retracted against the body 216 of the proppant tower 200 in its vertical orientation, it will be appreciated by one of skill in the art that the trailer 210 may be configured to aid in positioning the proppant tower 200 in its vertical orientation and thereafter to be detached from the proppant tower 200 and repositioned so as to transport another proppant tower (e.g., in the horizontal orientation, which may later be positioned in the vertical orientation by use of the trailer 210), without departing from the scope of the present disclosure.

As illustrated, the body 216 of the proppant tower 200 includes a bin 202. The bin 202 may be configured to receive and store proppant particulates. In some embodiments, the bin may be the size of a lower limit of about 56.6 m$^3$, 60.9 m$^3$, 65.2 m$^3$, 69.5 m$^3$, 73.8 m$^3$, 78.1 m$^3$, 82.4 m$^3$, 86.7 m$^3$, 91 m$^3$, 95.3 m$^3$, 99.6 m$^3$ to an upper limit of about 141.6 m$^3$, 137.3 m$^3$, 133 m$^3$, 128.7 m$^3$, 124.4 m$^3$, 120.1 m$^3$, 115.8 m$^3$, 111.5 m$^3$, 107.2 m$^3$, 102.9 m$^3$, and 98.6 m$^3$ (about 2000 ft$^3$ to about 5000 ft$^3$). In some embodiments, the bin 202 may be larger or smaller, depending on a number of factors including, but not limited to, the size of the work site, the estimated amount of proppant particulates required to perform a particular operation, and the like. In preferred embodiments, the bin 202 may be the size of between about 99.1 m$^3$ to about 127.2 m$^3$ (about 3500 ft$^3$ to about 4500 ft$^3$). In other preferred embodiments, the bin 202 may be the size of about 113.3 m$^3$ (4000 ft$^3$). It will be appreciated by one of skill in the art that the bin 202 may be a single compartment or may be divided into two or more compartments (e.g., three compartments, four compartments, five compartments, and the like), each of which may be capable of receiving and storing proppant particulates. Multiple bins 202 may be desired to increase the flow rate of the proppant particulates into the outlet 204 positioned at a location below the bin 202.

The proppant particulates may be any suitable for use in subterranean operations, including, but not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and any combination thereof. Suitable composite particulates may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof. The mean particulate size generally may range from about 2 mesh to about 400 mesh or less on the U.S. Sieve Series; however, in certain circumstances, other sizes or mixtures of sizes may be desired and will be entirely suitable for practice of the embodiments of the present disclosure.

In exemplary embodiments, and as depicted, the body 216 of the proppant tower 200 may be cylindrical in shape. The body 216 may have a height to diameter ratio of a lower limit of about 3:1, 3.2:1, 3.4:1. 3.6:1. 3.8:1, 4:1, 4.2:1, 4.4:1, and 4.6:1 to an upper limit of about 6:1, 5.8:1, 5.6:1, 5.4:1, 5.2:1, 5:1, 4.8:1, and 4.6:1. However, other configurations and shapes may be utilized provided that it has the proppant particulate storage capacity disclosed herein, without departing from the scope of the present disclosure. For example, the body 216 of the proppant tower 200 may be rectangular in shape, polygonal in shape, and the like, without departing from the scope of the present disclosure.

As illustrated in FIG. 2, the outlet 204 is arranged on the body 216 of the proppant tower 200 at a location below the bin 202 and is fluidly coupled to the bin 202, such that proppant particulates in the bin 202 may be discharged through the outlet 204 and into a collection device, such as a blender (e.g., metering screw blender), or other transport equipment for use in downhole operations, by gravity. The outlet 204 is positioned at height 214 of at least about 3 m (10 ft), measured from the point of contact between the outlet 204 and the body 216 and the bottom of the outrigger base 208. In some embodiments, the height 214 of the outlet 204 may be between a lower limit of about 3 m, 3.2 m, 3.4 m, 3.6 m, 3.8 m, 4 m, 4.2 m, 4.4 m, and 4.6 m to an upper limit of about 6 m, 5.8 m, 5.6 m, 5.4 m, 5.2 m, 5 m, 4.8 m, and 4.6 m (about 10 ft to about 20 ft), measured from the point of contact between the outlet 204 and the body 216 and the bottom of the outrigger base 208. In preferred embodiments, the height 214 of the outlet 204 is about 4.3 m (14 ft), measured from the point of contact between the outlet 204 and the body 216 and the bottom of the outrigger base 208. The outlet 204 may be positioned higher on the body 216 of the proppant tower 200, provided that substantially all of the proppant particulates in the bin 202 are capable of gravity discharging from the bin 202 and into the outlet 204 (i.e., the bin 202 would correspondingly be located at a greater height).

In order to achieve gravity discharge of the proppant particulates from the bin 202 and into the outlet 204, the angle 212 of the outlet 204 with respect to the body 216 of the proppant tower 200 is less than about 55°. In some embodiments, where the outlet 204 is located higher than about 4.3 m (14 ft), the angle 212 may be more acute, or substantially more acute. In some embodiments, the angle 212 of the outlet 204 with respect to the body 216 of the proppant tower 200 may be between an upper limit of about 55°, 50°, 45°, 40°, and 35° to a lower limit of about 15°, 20°, 25°, 30°, and 35°. In some exemplary embodiments, the angle 212 of the outlet 204 is about 45°. It will be appreciated by one of skill in the art that the angle 212 of the outlet with respect to the body 216 is designed to permit gravity discharge of the proppant particulates from the bin 202, while maintaining the relatively small equipment footprint of the proppant tower 200 in its vertical orientation. While some exemplary embodiments described herein are directed toward gravity discharge of the proppant particulates, it will be appreciated by one of skill in the art that other systems of discharging the proppant particulates from the bin 202 and into the outlet 204 may be utilized, without departing from the scope of the present disclosure (e.g., by mechanical or electronic systems).

The discharge rate of the proppant particulates from the bin 202 and through the outlet 204 may be at a rate of a lower limit of about 0 cubic feet per minute (ft³/min), such as when the proppant tower 200 is not in use. In other embodiments, the discharge rate of the proppant particulates from the bin 202 and through the outlet 204 may be at a rate of a lower limit of about 0.25 ft³/min, 1 ft³/min, 25 ft³/min, 50 ft³/min, 75 ft³/min, 100 ft³/min, and 125 ft³/min to an upper limit of about 250 ft³/min, 225 ft³/min, 200 ft³/min, 175 ft³/min, 150 ft³/min, and 125 ft³/min. In other embodiments, the discharge rate of the proppant particulates from the bin 202 and through the outlet 204 may be at a rate of about 200 ft³/min.

Figure 3:
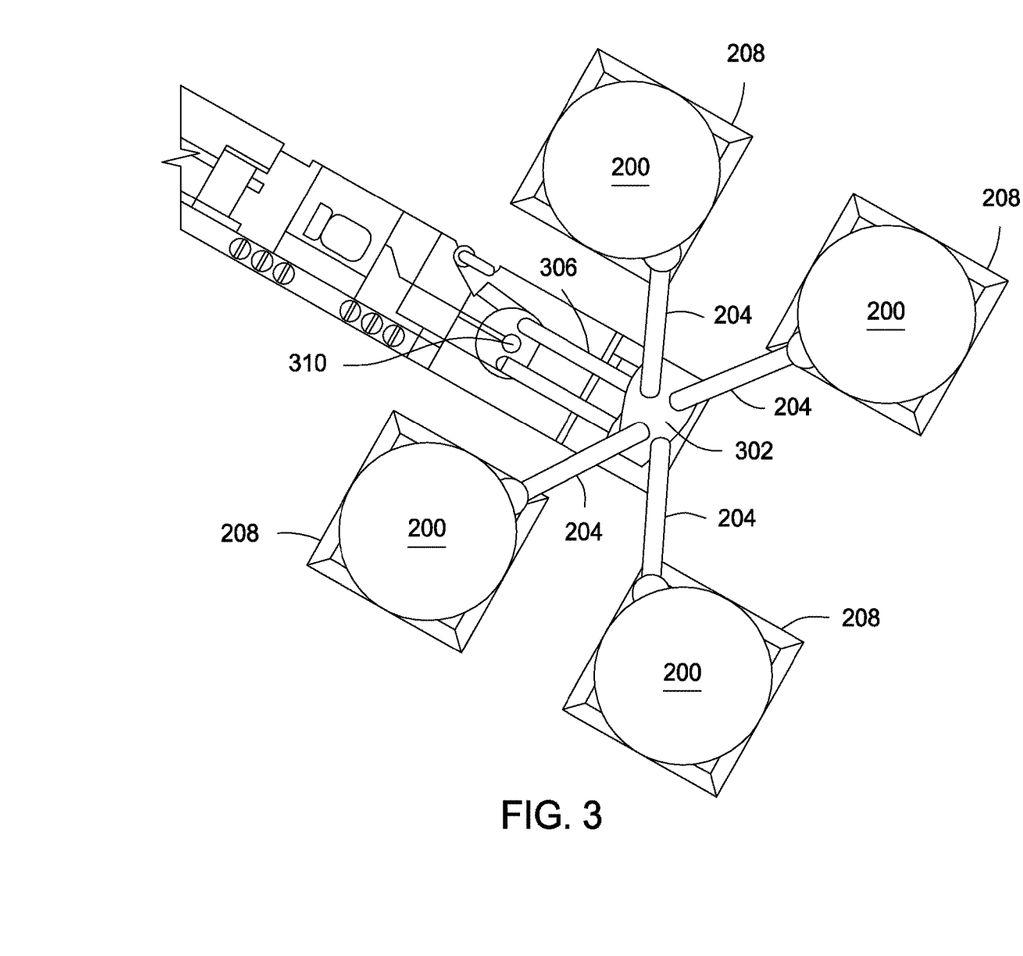
FIG. 3 illustrates a top view of an exemplary proppant storage and dispensing system comprising four proppant towers, according to one or more embodiments disclosed herein.

Referring now to FIG. 3, with continued reference to FIGS. 1 and 2, illustrated is a top view of an exemplary proppant storage and dispensing system comprising four proppant towers, according to one or more embodiments disclosed herein. As depicted, four proppant towers 200 are arranged about pumping truck 114 (FIG. 1). Each of the proppant towers 200 are resting on outrigger bases 208 in the vertical orientation. Each proppant tower 200 includes an outlet 204 arranged on the body 216 (not shown) of the proppant tower 200 at a location below the bin 202 (not shown) and is fluidly coupled to the bin 202, such that proppant particulates in the bin 202 may be discharged through the outlet 204 and into a blender 302 by gravity mounted on a pump truck 114. As depicted, in one embodiment, the blender 302 may be a proppant metering screw hopper and the pump truck 114 may have further mounted thereon proppant metering screws 306 and a mixing system 310. The blender 302 may receive the proppant particulates from one or more outlets 204, the metering screws 306 may then meter and convey the proppant particulates to the mixing system 310. Although the blender 302 is depicted in FIG. 3 as a proppant metering screw hopper, any equipment capable of receiving the proppant particulates and/or for preparing the proppant particulates for use in a downhole operation may be used in accordance with the embodiments described herein. Moreover, the blender 302 need not be mounted on a pump truck 114, but may be skid mounted, trailer mounted, or otherwise arranged at the work site, without departing from the scope of the present disclosure.

As depicted, the outlets 204 are located on the body 216 (not shown) of the proppant towers 200 at a specific location to permit grouping of multiple (four shown) proppant towers 200 about a single blender 302. As depicted, the outlets 204 are angularly disposed at a corner of the outrigger base 208. In some embodiments, the proppant tower 200 may be rectangular or square shaped, and in such embodiments, the outlet 204 may extend radially along a median plane parallel to either corner of the rectangle or square of the face thereof across from the retracted trailer 210.

The proppant towers 200 described in the present disclosure may include additional components not specifically depicted in the figures herein, without departing from the scope of the present disclosure. Such components may include, but are not limited to, solar panels, weighting systems capable of managing proppant particulate inventory, a motor or other means of aiding the discharge of the proppant particulates from the bin 202 and into the outlet 204, an override gate or mechanism, refilling inlets, and the like.

The combination of the location of the outlets 204, the height of the outlets 204, and the angle of the outlets 204 permit at least four of the exemplary proppant towers 200 described in the present disclosure to be arranged about a single blender 302, which may be mounted on a pump truck 114. Those skilled in the art will readily recognize the advantages of being able to position at least four proppant towers 200 about a single blender 302 including, but not limited to, a decreased equipment footprint at the work site, elimination or reduction of additional equipment used with traditional proppant storage vessels (e.g., conveyer belts, proppant storage facilities, and the like), increased proppant particulate volume at the location of its use at the well site, and the like. Such advantages translate into work site efficiency and cost savings.

Each of the four proppant towers 200 arranged about the blender 302 mounted on pump truck 114 may be used simultaneously or singly. If used singly, each remaining unused proppant tower 200 serves as storage for additional proppant particulates if, or when, the proppant particulates in the first proppant tower are exhausted. Such use may eliminate or reduce the need for refilling the proppant towers 200 with proppant particulates or any work stoppage or labor requirements associated therewith.

Embodiments disclosed herein include:

A. A proppant tower comprising: a main body configured to be in a substantially vertical orientation in a working position; a base mounted on a bottom end of the main body, such that the main body rests on the base when in the working position; a bin disposed within the main body, the bin configured to hold particulates therein; and an outlet having two ends, the first end radially extending from the main body below the bin and in fluid communication with the bin and the second end being open, such that particulates are discharged from the bin into the first end of the outlet and out of the second end of the outlet, wherein the outlet radially extends from the main body at a height of at least about 3 m from a bottom end of the base, wherein the outlet radially extends from the main body, such that an angle of less than about 55° is formed between the outlet and the main body, and wherein the outlet radially extends from the main body at a location on the main body that permits at least four proppant towers to be arranged about a single particulate collection device.

B. A method comprising: providing four proppant towers, each tower comprising: a main body configured to be in a substantially vertical orientation in a working position; a base mounted on a bottom end of the main body, such that the main body rests on the base when in the working position; a bin disposed within the main body, the bin holding particulates therein; and an outlet having two ends, the first end radially extending from the main body below the bin and in fluid communication with the bin and the second end being open, such that particulates from the bin may flow into the first end of the outlet and out of the second end of the outlet, wherein the outlet radially extends from the main body at a height of at least about 3 m from a bottom end of the base, wherein the outlet radially extends from the main body, such that an angle of less than about 55° is formed between the outlet and the main body, and wherein the outlet radially extends from the main body at a location on the main body that permits at least four proppant towers to be arranged about a single particulate collection device; arranging the four proppant towers about a single particulate collection device; and discharging the particulates from at least one of the four proppant towers, the particulates being discharged from the bin, into the first end of the outlet, and out of the second end of the outlet into the single particulate collection device.

Each of embodiments A and B may have one or more of the following additional elements in any combination:

Element 1: Wherein the particulates are discharged from the bin into the first end of the outlet and out of the second end of the outlet by gravity.

Element 2: Wherein the particulates are discharged from the bin into the first end of the outlet and out of the second end of the outlet at a rate of about 0.25 ft$^3$/min to about 250 ft$^3$/min.

Element 3: Wherein the particulates are discharged from the bin into the first end of the outlet and out of the second end of the outlet at a rate of about 200 ft$^3$/min.

Element 4: Wherein the height of the outlet radially extending from the main body is between about 3 m and 6 m from the bottom end of the base.

Element 5: Wherein the height of the outlet radially extending from the main body is about 4.3 m from the bottom end of the base.

Element 6: Wherein the angle of the outlet radially extending from the main body is between about 55° and about 15°.

Element 7: Wherein the angle of the outlet radially extending from the main body is between about 55° and about 45°.

Element 8: Wherein the main body is cylindrical in shape, having a height to diameter ratio of about 3:1 to about 6:1.

Element 9: Wherein the main body further comprises a trailer configured to transport the proppant tower in a substantially horizontal orientation and to raise the proppant tower to the substantially vertical orientation in the working position.

Element 10: Wherein the particulates are discharged from the bin, into the first end of the outlet, out of the second end of the outlet, and into the single particulate collection device by gravity.

By way of non-limiting example, exemplary combinations applicable to A and B include: A with 1 and 4; A with 5, 7, and 9; B with 1 and 2; and B with 3, 6, 8, and 10.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A proppant storage and dispensing system, comprising:
 a proppant tower, including:
  a main body configured to be in a substantially vertical orientation in a working position;
  a base mounted on a bottom end of the main body, such that the main body rests on the base when in the working position;
  a bin disposed within the main body, the bin configured to hold particulates therein; and
  an outlet having two ends, the first end radially extending from the main body below the bin and in fluid communication with the bin and the second end being open, such that particulates are discharged from the bin into the first end of the outlet and out of the second end of the outlet,
  wherein the outlet radially extends from the main body at a height of at least 3 m from a bottom end of the base,
  wherein the outlet radially extends from the main body, such that an angle of less than 55° is formed between the outlet and the main body, and
  wherein the outlet radially extends from the main body at a location on the main body that permits at least four proppant towers to be arranged about a single particulate collection device; and
 a blender including a hopper and at least one proppant metering screw, wherein the hopper is disposed below the second end of the outlet and the at least one proppant metering screw conveys particulates from the hopper.

2. The proppant storage and dispensing system of claim 1, wherein the particulates are discharged from the bin into the first end of the outlet and out of the second end of the outlet by gravity.

3. The proppant storage and dispensing system of claim 1, wherein the particulates are discharged from the bin into the first end of the outlet and out of the second end of the outlet at a rate of 0.25 ft$^3$/min to 250 ft$^3$/min.

4. The proppant storage and dispensing system of claim 1, wherein the particulates are discharged from the bin into the first end of the outlet and out of the second end of the outlet at a rate of 200 ft$^3$/min.

5. The proppant storage and dispensing system of claim 1, wherein the height of the outlet radially extending from the main body is between 3 m and 6 m from the bottom end of the base.

6. The proppant storage and dispensing system of claim 1, wherein the height of the outlet radially extending from the main body is 4.3 m from the bottom end of the base.

7. The proppant storage and dispensing system of claim 1, wherein the angle of the outlet radially extending from the main body is between 55° and 15°.

8. The proppant storage and dispensing system of claim 1, wherein the angle of the outlet radially extending from the main body is between 55° and 45°.

9. The proppant storage and dispensing system of claim 1, wherein the main body is cylindrical in shape, having a height to diameter ratio of 3:1 to 6:1.

10. The proppant storage and dispensing system of claim 1, wherein the main body further comprises a trailer configured to transport the proppant tower in a substantially horizontal orientation and to raise the proppant tower to the substantially vertical orientation in the working position.

11. A method comprising:
providing four proppant towers, each tower comprising:
- a main body configured to be in a substantially vertical orientation in a working position;
- a base mounted on a bottom end of the main body, such that the main body rests on the base when in the working position;
- a bin disposed within the main body, the bin holding particulates therein; and
- an outlet having two ends, the first end radially extending from the main body below the bin and in fluid communication with the bin and the second end being open, such that particulates from the bin may flow into the first end of the outlet and out of the second end of the outlet,
- wherein the outlet radially extends from the main body at a height of at least 3 m from a bottom end of the base,
- wherein the outlet radially extends from the main body, such that an angle of less than 55° is formed between the outlet and the main body, and
- wherein the outlet radially extends from the main body at a location on the main body that permits at least four proppant towers to be arranged about]a single particulate collection device;

arranging the four proppant towers about a single particulate collection device including a hopper and at least one proppant metering screw, wherein the hopper is disposed below the second end of the outlet of each of the four proppant towers; and discharging the particulates from at least one of the four proppant towers, the particulates being discharged from the bin, into the first end of the outlet, and out of the second end of the outlet into the hopper of the single particulate collection device.

12. The method of claim 11, wherein the particulates are discharged from the bin, into the first end of the outlet, out of the second end of the outlet, and into the single particulate collection device by gravity.

13. The method of claim 11, wherein the particulates are discharged from the bin into the first end of the outlet and out of the second end of the outlet at a rate of 0.25 ft$^3$/min to 250 ft$^3$/min.

14. The method of claim 11, wherein the particulates are discharged from the bin into the first end of the outlet and out of the second end of the outlet at a rate of 200 ft$^3$/min.

15. The method of claim 11, wherein the height of the outlet radially extending from the main body is between 3 m and 6 m from the bottom end of the base.

16. The method of claim 11, wherein the height of the outlet radially extending from the main body is 4.3 m from the bottom end of the base.

17. The method of claim 11, wherein the angle of the outlet radially extending from the main body is between 55° and 15°.

18. The method of claim 11, wherein the angle of the outlet radially extending from the main body is between 55° and 45°.

19. The method of claim 11, wherein the main body is cylindrical in shape, having a height to diameter ratio of 3:1 to 6:1.

20. The method of claim 11, wherein the main body further comprises a trailer configured to transport the proppant tower in a substantially horizontal orientation and to raise the proppant tower to the substantially vertical orientation in the working position.

* * * * *